United States Patent
Rantala et al.

(10) Patent No.: US 8,352,197 B2
(45) Date of Patent: Jan. 8, 2013

(54) METHOD AND ARRANGEMENT FOR MONITORING AND PRESENTING THE STATUS OF AN ELECTROLYTIC PROCESS IN AN ELECTROLYTIC CELL

(75) Inventors: Ari Rantala, Porvoo (FI); Lauri Nordlund, Helsinki (FI); Jyrki Malinen, Espoo (FI)

(73) Assignee: Outotec Oyj, Espoo (FI)

( * ) Notice: Subject to any disclaimer, the term of this patent is extended or adjusted under 35 U.S.C. 154(b) by 260 days.

(21) Appl. No.: 12/743,810

(22) PCT Filed: Nov. 19, 2008

(86) PCT No.: PCT/FI2008/050669
§ 371 (c)(1), (2), (4) Date: Nov. 17, 2010

(87) PCT Pub. No.: WO2009/068734
PCT Pub. Date: Jun. 4, 2009

(65) Prior Publication Data
US 2011/0054802 A1 Mar. 3, 2011

(30) Foreign Application Priority Data
Nov. 30, 2007 (FI) ...................................... 20075860

(51) Int. Cl.
*G06F 19/00* (2011.01)

(52) U.S. Cl. ...................................................... 702/22

(58) Field of Classification Search .................. 702/22
See application file for complete search history.

(56) References Cited

U.S. PATENT DOCUMENTS
4,024,034 A  5/1977  Doring et al.
(Continued)

FOREIGN PATENT DOCUMENTS
EP  1239061 A2  9/2002

OTHER PUBLICATIONS

J. E. O'Brien, Status of the INL High-Temperature Electrolysis Research Program—Experimental and Modeling, Fourth Information Exchange Meeting on the Nuclear Production of Hydrogen, Apr. 2009, 13 pages.*

(Continued)

*Primary Examiner* — Tung S Lau
(74) *Attorney, Agent, or Firm* — Chernoff, Vilhauer, McClung & Stenzel LLP (57) ABSTRACT

The invention relates to an arrangement and method for monitoring and presenting the status of an electrolytic process in an electrolytic cell (1). The arrangement is characterized by a return channel arrangement (8) for transmitting status information, established by the data processing means (7) of a data processing device (6) and describing the status of the electrolytic process in the electrolytic cell (1), from the data processing device (6) to an indicator device (9) arranged in connection with the electrolytic cell (1). The indicator device (9) comprises first presentation means (10) for presenting the status information established by the data processing means (7) of the data processing device (6) and describing the status of the electrolytic process in the electrolytic cell (1). The indicator device (9) is arranged to receive the status information established by the data processing means (7) of the data processing device (6) and to present said status information established by the data processing means (7) of the data processing device (6) describing the status of the electrolytic process in the electrolytic cell (1) by the first presentation means (10).

30 Claims, 4 Drawing Sheets

U.S. PATENT DOCUMENTS

| | | |
|---|---|---|
| 6,360,849 B1 | 3/2002 | Hikita |
| 6,501,996 B1 | 12/2002 | Bieber |
| 2005/0218001 A1 | 10/2005 | You et al. |
| 2005/0240312 A1 | 10/2005 | Terry et al. |
| 2006/0015195 A1 | 1/2006 | Lehman |
| 2007/0125641 A1 | 6/2007 | Rantala |

OTHER PUBLICATIONS

Kalle Mikkola, International Search Report for PCT/FI2008/050669, Feb. 27, 2009.

* cited by examiner

METHOD AND ARRANGEMENT FOR MONITORING AND PRESENTING THE STATUS OF AN ELECTROLYTIC PROCESS IN AN ELECTROLYTIC CELL

This is a national stage application filed under 35 USC 371 based on International Application No. PCT/FI2008/050669, filed Nov. 19, 2008 and claims priority under 35 USC 119 of Finnish Patent Application No. FI 20075860, filed Nov. 30, 2007.

BACKGROUND OF THE INVENTION

The invention relates to an arrangement for monitoring and presenting the status of an electrolytic process such as an metal electrorefining process or an metal electrowinning process in an electrolytic cell according to the preamble of claim 1.

The invention also relates to an arrangement for monitoring and presenting the status of an electrolytic process such as an metal electrorefining process or an metal electrowinning process in an electrolytic cell according to the preamble of claim 16.

In a process for electrorefining or for electrowinning of metals, the desired metal is precipitated on the surface of an electrode, i.e. a cathode. The processing is carried out by electric current in an electrolytic cell, and in the liquid, i.e. electrolyte contained in the cell, there are immersed in turn a number of sheet-like anodes and sheet-like cathodes made of an electroconductive material. The desired metal is precipitated on the cathode either so that in the electrolytic treatment, there is used a soluble anode made of the same metal as the metal to be precipitated, or there is used a non-soluble anode. A soluble anode is used for example in copper electrorefining, and a non-soluble anode is used for example in nickel or zinc electrowinning.

In the electrolytic purification of copper, the impure copper, i.e. so-called anode copper, is dissolved by means of electric current, and the dissolved copper is reduced on the cathode sheet as very pure copper, so-called cathode copper. The employed electrolyte is a sulfuric acid based copper sulfate solution. In the beginning of the process, the employed cathode sheet is a copper seed plate or a so-called permanent cathode that can be made of acid-proof steel or titanium. The employed power source in electrolysis is one or several rectifiers. The power densities generally used in electrolysis are 250-340 $A/m^2$, and the current is direct current (DC) or so-called periodical reverse current (PRC). Electrolysis is carried out in separate electrolytic cells, where the number of anode-cathode pairs varies from plant to plant, typically between 30 and 80 pairs. The number of electrolytic cells in the plants also differs. Anodes are typically dissolved for 14-21 days, while the cathode cycle is 7-10 days.

Information of the electrolytic process is collected by means of physical and chemical measurements. Conventional measurement parameters are electrolyte temperature, composition, magnitude of electric current and cell voltage. On the basis of the obtained information, conclusions are made regarding the status of the process, and when necessary, control measures are taken for correcting the development of the process status in the right direction.

Real-time monitoring and observation of the status and efficiency of an electrolytic process is challenging, because there are typically hundreds of electrolytic cells in a production plant. Conventionally the process management is based on outdated information and on the observations of process operators. In addition, a lot of manual operations are required of the process operators, mostly due to the process structure and the lack of aiding technologies.

Publication EP 1 239 061 A2 discloses a galvanization plant that comprises an arrangement for indicating the status of groups of cells.

In the publication WO 2005/052700 (Outokumpu Oyj) and in the publication WO 2005/090644 (Kennecott Utah Copper Corporation), there are described methods for creating real-time monitoring systems. For example by these methods, there can be made a calculatory estimate of the real-time status and efficiency of each cell, based on the process estimates measured from the cell, such as cell voltage, electrolyte temperature, electrolyte composition and electric current passing through the cell. Thus, the state of the currently known art is represented by wired and wireless systems that collect information from the process status (for instance of shortcuts occurring in electrolytic cells) and can be observed from a centralized control center/display screen/database/etc.

In the publication WO 2005/052700 (Outokumpu Oyj), there is introduced a method for controlling an electrolytic process and plant, utilizing history data collected in the process as well as mathematical and heuristic models created on the basis of empirical knowledge, and by means of said models, there are defined status indexes as well as alternatively also condition indexes on the basis of real-time measurement parameters from the process. The method makes use of real-time cell voltage and temperature measurements. On the basis of the obtained real-time indexes, there is achieved a correctly focused process control action at the correct point of time. The invention described in the publication WO 2005/052700 has in practice been applied in the CellSense™ control system by Outotec Oyj, said system being a computer program by which for example the operation of single electrolytic cells in an electrolytic plant can be observed cell-specifically, in a centralized way in a control center.

The publication WO 2005/090644 (Kennecott Utah Copper Corporation) introduces an electrolytic cell, monitoring system, a device for monitoring an electrolytic cell and a method for monitoring an electrolytic cell. The invention described in the publication WO 2005/090644 has in practice been applied in the CellSensor™ device of Outotec Oyj, said device being a device for measuring the process parameters in an electrolytic process carried out in an electrolytic cell, and for wirelessly transmitting the measured process parameters to the CellSense™ control system for an analysis of the measured process parameters and for calculating a cell-specific real-time status index for each electrolytic cell included in the system.

A drawback in the CellSense™ control system is that the real-time information describing the electrolytic process, such as a status or condition index, can only be seen on the computer screen, i.e. in the location where the CellSense™ control system is being used and where it is physically located, for instance in the control center of an electrolytic plant, or in a few centralized points of observation in the electrolytic plant. Consequently, corrective or anticipatory measures require that the control center first has detected a problem, and that the detected problem is thereafter communicated to the control center process operator, and only then can the process operator perform the necessary measures for eliminating the problem.

The object of the present invention is to realize an arrangement and method by which process operators can in real time observe the status of an electrolytic process, locally and cell-specifically at individual electrolytic cells of an electrolytic plant, without needing any portable auxiliary devices.

BRIEF DESCRIPTION OF THE INVENTION

The object of the invention is achieved by an arrangement according to the independent claim 1.

Preferred embodiments of an arrangement according to the invention are set forth in the dependent claims 2-15.

The invention also relates to a method according to the independent claim 16.

Preferred embodiments of the invention are set forth in the dependent claims 17-30.

The present invention enables a local indication of the status and also condition of electrolytic cells by means of an indicator device placed in the cell or in the immediate vicinity thereof. The task of the indicator device is to inform the process operators of the status of the electrolytic cell in real time. Thus the process operators can start corrective measures, for instance elimination of shortcuts, correcting electrolyte circulation, correcting the position of electrodes, elimination of factors affecting earth leakages or some other corresponding measure connected to the daily cell operations as soon as possible.

The invention improves the efficiency of process operators and increases both the safety and meaningfulness of work, because the work with the cells can be focused in correcting the status of problematic cells, instead of looking for them.

A remarkable improvement in the system according to the invention, as compared to the generally known prior art, is achieved by the advantages brought by the data return channel. By an indicator device according to the invention, the status—established or calculated either by the above described methods or by some other method or methods—is indicated to the process operators locally in the vicinity of the cell. On the basis of the data obtained from the indicator device, the process operator makes locally a decision as regards the need for maintenance or status correction of each cell provided with a module.

The indicator device can be for example a unit provided with one or several sound signals and/or a visually observable, status-indicating element, for instance light, preferably a LED having low power consumption.

LIST OF DRAWINGS

A few preferred embodiments of the invention are described in more detail below with reference to the appended drawings, where.

DETAILED DESCRIPTION OF THE INVENTION

The drawings illustrate an arrangement in an electrolytic process for monitoring the status of an electrolytic process in an electrolytic cell 1 and for presenting said status.

The arrangement comprises at least one sensor 3 fitted in the electrolytic cell 1, for regularly and repeatedly measuring at least one process parameter in the electrolytic process.

The arrangement further comprises a data processing device 6 including data processing means 7 for interpreting the process parameters regularly and repeatedly measured by the sensor 3 and for establishing status information describing the status of the electrolytic process in the electrolytic cell 1 by using the process parameters regularly and repeatedly measured by the sensor 3.

The arrangement further comprises a transmission system 16 for transmitting the process parameters regularly and repeatedly measured by the sensor 3 from the sensor 3 to the data processing device 6.

The transmission system 16 for transmitting process parameters, illustrated in the drawings, comprises a first electronic device 2, which is in communication with at least one sensor 3 arranged in the electrolytic cell 1, for regularly and repeatedly measuring at least one process parameter in the electrolytic process. The first electronic device 2 is arranged to transmit the process parameters regularly and repeatedly measured by the sensor 3 in the electrolytic process of the electrolytic cell 1 from the first electronic device 2.

In one electrolytic cell 1, there can be arranged several different sensors 3, each of which is arranged to measure different process parameters, for example cell voltage, electrolyte temperature, electrolyte composition or electric current flowing through the cell. One first electronic device 2 can be in communication with many such sensors 3 provided for different purposes, so that different types of process parameter data are fed from several sensors 3 to one first electronic device 2.

Figure 3:
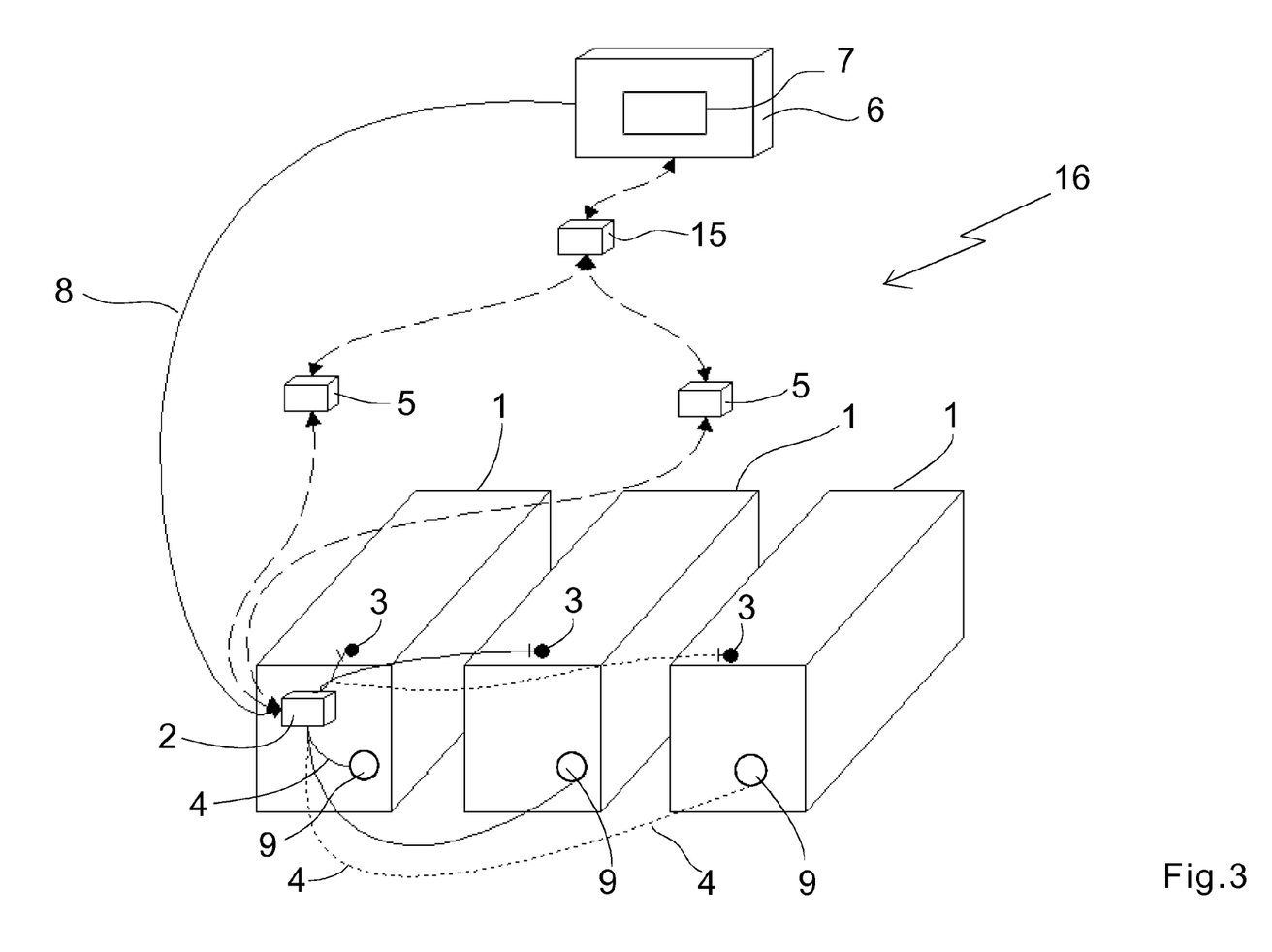
FIG. 3 illustrates a third preferred embodiment of an arrangement according to the invention and FIG. 4 illustrates a fourth preferred embodiment of an arrangement according to the invention.

One first electronic device 2 can be in communication with sensors 3 placed in different electrolytic cells 1, as is illustrated in FIG. 3.

An arrangement according to the invention comprises preferably but not necessarily, a sensor 3 for measuring the temperature of the electrolyte in the electrolytic cell 1.

An arrangement according to the invention also comprises, in addition, or as an alternative, preferably but not necessarily, a sensor 3 for measuring the circulation in the electrolytic cell.

An arrangement according to the invention also comprises, in addition, or as an alternative, preferably but not necessarily, a sensor 3 for measuring the composition of the electrolyte in the electrolytic cell.

An arrangement according to the invention also comprises, in addition, or as an alternative, preferably but not necessarily, a sensor 3 for measuring the electric current flowing through the electrolytic cell.

An arrangement according to the invention also comprises, in addition, or as an alternative, preferably but not necessarily, a sensor 3 for measuring the cell-specific magnetic field in the electrolytic cell.

An arrangement according to the invention also comprises, in addition, or as an alternative, preferably but not necessarily, a sensor 3 for measuring the magnetic field in the electrolytic cell at several different points.

An arrangement according to the invention also comprises, in addition, or as an alternative, preferably but not necessarily, a sensor 3 for measuring the stray currents in the electrolytic cell 1.

An arrangement according to the invention also comprises, in addition, or as an alternative, preferably but not necessarily, a sensor 3 for measuring the additives in the electrolytic cell 1.

An arrangement according to the invention also comprises, in addition, or as an alternative, preferably but not necessarily, a sensor 3 for measuring the temperature of the conductor rails in the electrolytic cell 1. An arrangement according to the invention also comprises, in addition, or as an alternative, preferably but not necessarily, a sensor 3 for measuring some other parameter than one of the above enlisted parameters in the electrolytic cell.

Figure 1:
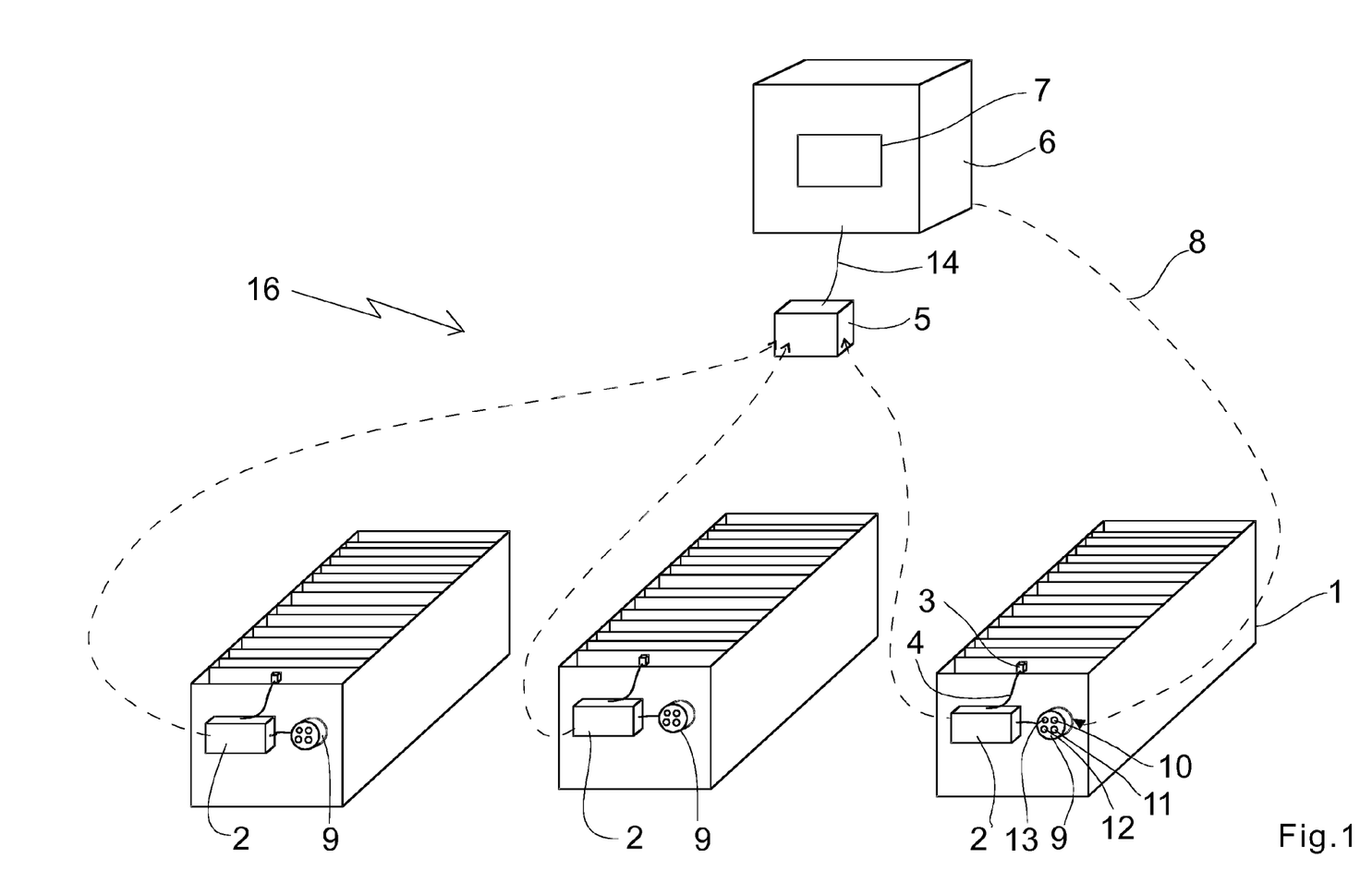
FIG. 1 illustrates a preferred embodiment of an arrangement according to the invention.

The first electronic device 2 and the sensor/sensors 3 can be mutually integrated, or they can be separate devices that are functionally connected, as is illustrated in FIG. 1.

In between the first electronic device 2 and the sensor/sensors 3, there is preferably but not necessarily, arranged a permanent connection, such as conductors 4.

The first electronic device 2 comprises, preferably but not necessarily, first transmitter means (not illustrated) for wirelessly transmitting the process parameters measured regularly and repeatedly by the sensor 3 from the first electronic device 2.

The first electronic device 2 and the sensor 3 constitute, preferably but not necessarily, a CellSensor™ device (Outotec Oyj).

The process parameter transmission system 16 of the arrangement illustrated in the Figures also comprises a second electronic device 5, which is in communication with the first electronic device 2 for receiving the process parameters regularly and repeatedly measured by the sensor 3 from the first electronic device 2.

The second electronic device 5 comprises, preferably but not necessarily, first receiver means (not illustrated) for receiving wirelessly the process parameters measured regularly and repeatedly by the sensor 3 from the first electronic device 2.

Figure 2:
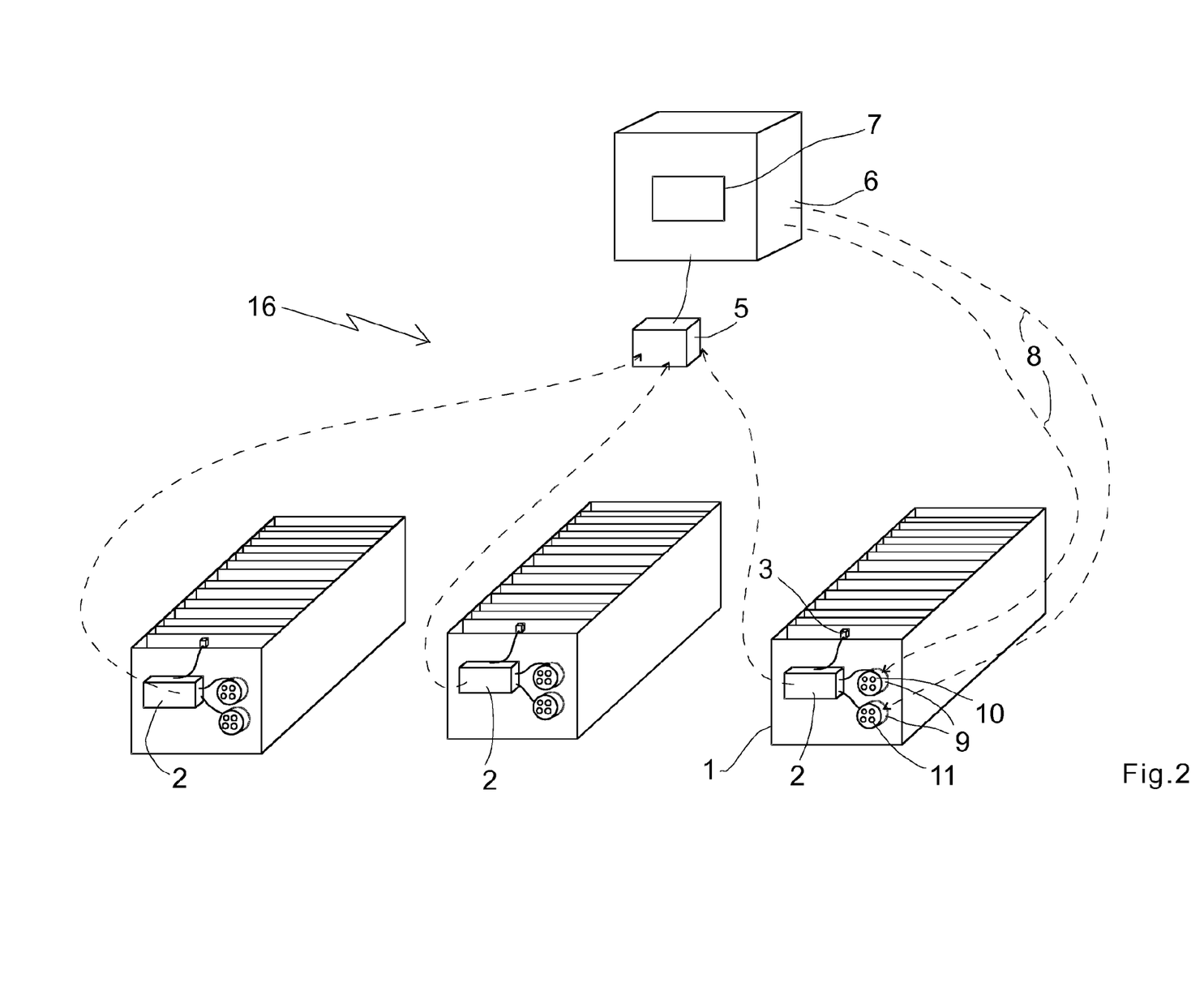
FIG. 2 illustrates another preferred embodiment of an arrangement according to the invention.

The first electronic device 2 and the second electronic device 5 are, preferably but not necessarily, located physically apart, as is illustrated in FIGS. 1 and 2. In between the first electronic device 2 and the second electronic device 5, there is arranged, preferably but not necessarily, a wireless connection.

The second electronic device 5 is, preferably but not necessarily, arranged to receive process parameters from several first electronic devices 2, each of which is arranged to be in communication with a sensor 3 or sensors 3 placed in a different electrolytic cell/cells 1. In other words, the second electronic device 5 is, preferably but not necessarily, in communication with several first devices 2, so that the second electronic device 5 is arranged to receive process parameters from several first electronic devices 2, and thus process parameters from several electrolytic cells 1, as is illustrated in FIGS. 1 and 2.

Figure 4:
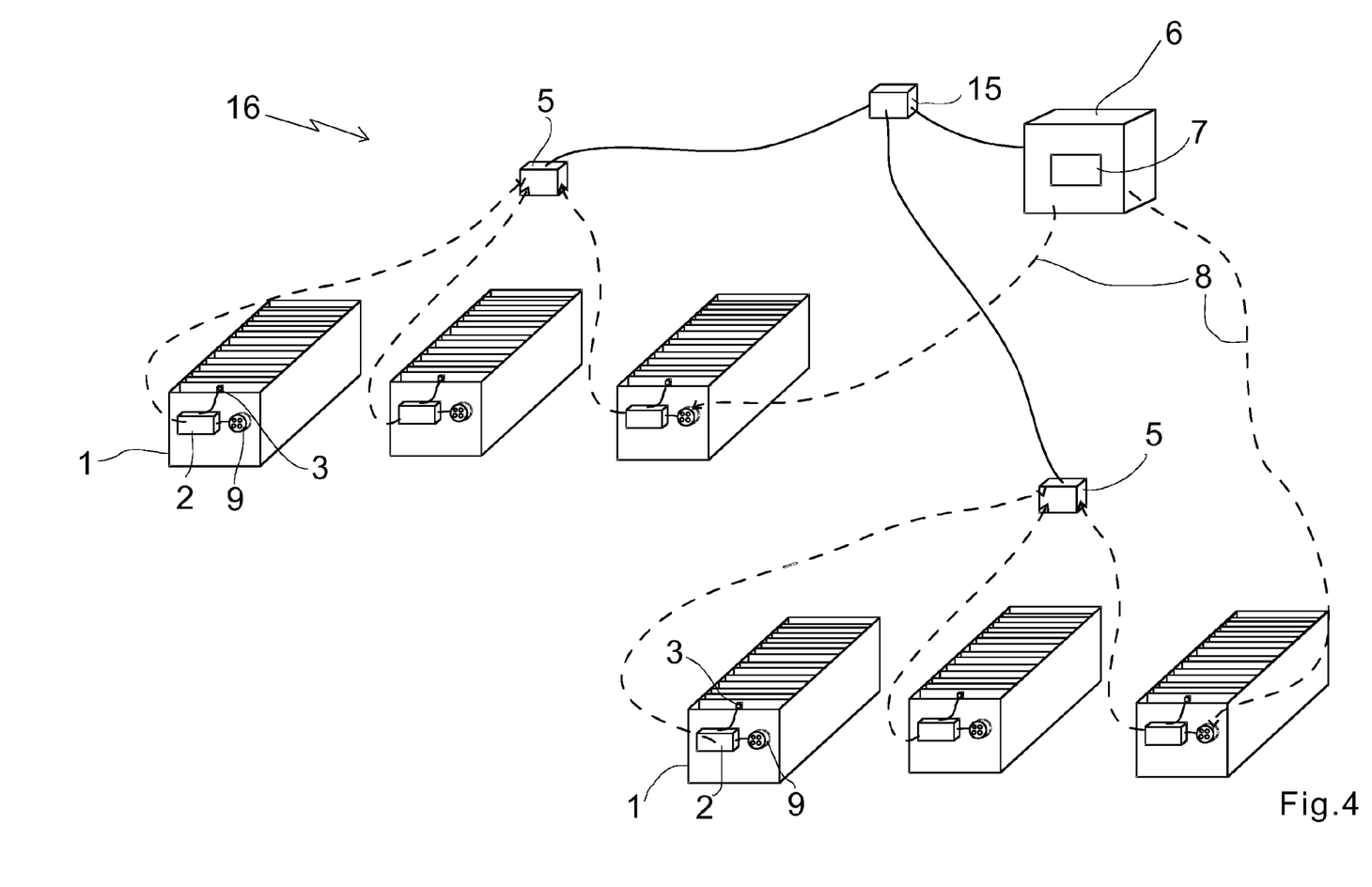

The process parameter transmission system 16 illustrated in FIGS. 3 and 4 includes yet a third electronic device 15, which is arranged to receive process parameters from several second electronic devices 5. The third electronic device 15 is connected to a data processing device 6. The number of second electronic devices 5 in the installations is typically 1-20, and the number of third devices is 15 1-4.

The arrangement also comprises a data processing device 6, which in FIGS. 1 and 2 is in communication with a second electronic device 5. The second electronic device 5 is arranged to transmit the process parameters measured regularly and repeatedly by the sensor/sensors 3 from the electrolytic process in the electrolytic cell/cells 1 further to the data processing device 6 for processing the process parameters.

The second electronic device 5 and the data processing device 6 can be mutually integrated, or they can be separate devices that are functionally connected.

The data processing device 6 comprises data processing means 7 for interpreting the process parameters regularly and repeatedly measured by the sensor 3 from the electrolytic process in the electrolytic cell 1, and for establishing information describing the status of the electrolytic process in the electrolytic cell 1, for instance status or condition information, by using the process parameters regularly and repeatedly measured by the sensor 3 from the electrolytic process in the electrolytic cell 1.

The data processing device 6 can be a computer, and the data processing means 7 can be a computer program installed in the computer memory.

The data processing means 7 comprise, preferably but not necessarily, the CellSense™ program (Outotec Oyj).

The arrangement also comprises a return channel arrangement 8 for transmitting the status information describing the status of the electrolytic process in the electrolytic cell 1, established by the data processing means 7, from the data processing device 6 to an indicator device 9 arranged in connection with the electrolytic cell 1.

The indicator device 9 is preferably, but not necessarily, a cell specific indicator device that is configured to present only the status of the electrolytic cell 1 in connection which the indicator device 9 is arranged.

The indicator device 9 is preferably, but not necessarily, fixedly or releasably fastened to the electrolytic cell 1 or integrated into the electrolytic cell 1.

The indicator device 9 comprises presentation means 10 for indicating the status information describing the status of the electrolytic process in the electrolytic cell 1, established by the data processing means 7 of the data processing device 6.

The indicator device 9 is arranged to receive the status information describing the status of the electrolytic process in the electrolytic cell 1, established by the data processing means 7 of the data processing device 6, and to present said status information by presentation means 10 provided in the data processing device 6.

The process parameter transmission system 16 is, preferably but not necessarily, arranged to convert the process parameters measured by the sensor 3 to data signals representing said process parameters, and to transmit the data signals representing the process parameters to the data processing device 6. Now the data processing means 7 of the data processing device 6, provided for interpreting process parameters and for establishing status information describing the electrolytic process in the electrolytic cell 1, are arranged to interpret the data signals representing the process parameters and to establish status information describing the electrolytic process by using said data signals representing the process parameters.

The first electronic device 2 is, preferably but not necessarily, arranged to convert process parameters measured by the sensor 3 to data signals representing the process parameters, and to transmit data signals representing the process parameters from the first electronic device 2. For this purpose, the first electronic device 2 can include an A/D converter (not illustrated). Now the second electronic device 5 is arranged to receive data signals representing process parameters from the first electronic device 2 and to transmit data signals representing process parameters from the second electronic device 5 to a third electronic device 15. In this case the third electronic device 15 is arranged to receive data signals representing process parameters from the second electronic device 5 and to transmit data signals representing process parameters further from the third electronic device 15 to the data processing device 6. Now the data processing device 6 is arranged to receive data signals representing process parameters from the third electronic device 15. The data processing means 7 of the data processing device 6 are, preferably but not necessarily, first arranged to calculate the difference of the value of the process parameter measured by the sensor 3 and a predetermined and/or calculated theoretical process parameter value, and to establish a trend for the difference. Thereafter the data processing means 7 of the data processing device 6 are arranged to examine the difference and the trend of the difference by means of a mathematical model, and to establish an interpretation for the difference and the difference trend. Thereafter the data processing means 7 of the data processing device 6 are arranged to establish, on the basis of the interpretation of the difference and the difference trend, an interpretation of the difference trend of the status information describing the status of the electrolytic process in the electrolytic cell 1, by utilizing a fuzzy and/or a logic inference algorithm. An example of data processing means 7 functioning in this way is set forth in the publication WO 2005/052700 (Outokumpu Oyj).

The return channel arrangement 8 is, preferably but not necessarily, arranged to first transmit the status information describing the status of the electrolytic process in the electrolytic cell 1, established by the data processing device 6, from the data processing device 6 to a third device 15. Now the return channel arrangement 8 is arranged to receive the status information transmitted by the data processing device 6 in the third electronic device 15 and to transmit the status information established by the data processing device 6 further from the third electronic device 15 to the second electronic device 5. Next the return channel arrangement 8 is arranged to receive the status information transmitted by the data processing device 6 in the second electronic device 5 and to transmit the status information established by the data processing device 6 further from the second electronic device 5 to the first electronic device 2. Now the return channel arrangement 8 is arranged to receive the status information transmitted by the second electronic device 5 in the first electronic device 2 and to transmit the status information established by the data processing device 6 from the first electronic device 2 to an indicator device 9.

As an alternative, the return channel arrangement 8 can be arranged to transmit the status information describing the status of the electrolytic process in the electrolytic cell 1, established by the data processing device 6, directly from the data processing device 6 to the indicator device 9.

The indicator device 9 provided in connection with the electrolytic cell 1 comprises, preferably but not necessarily, presentation means 10 for visually presenting the status information describing the status of the electrolytic process in the electrolytic cell 1. When necessary, one indicator device 9 can also present the status information of several electrolytic cells 1.

In case the status information established by the processing means 7 of the data processing device 6 can obtain many different values, depending on the value of the process parameter measured by the sensor 3, for instance values 0 (normal level), 1 (warning), 2 (alarm), or 3 (critical), the presentation means 10 of the indicator device 9 are arranged to visually present the status information in different ways. For example, it is possible that the status information is presented by different colors, for instance green when the status information level is 0 (normal level), yellow when the status information level is 1 (warning), amber when the status information level is 2 (alarm), and red when the status information level is 3 (critical). As an alternative, a certain color can also illustrate a status information to be measured, in which case the different values of the status information are illustrated by using periods of different light frequencies: 0 (turned off), 1 (flashing slowly), 2 (flashing rapidly), 3 (burning continuously).

As an alternative, or in addition, the indicator device 9 arranged in connection with the electrolytic cell 1 may include presentation means 10 for presenting the status information describing the status of the electrolytic process in the electrolytic cell 1 by a sound signal or sound signals. The sound signal can also be different depending on the status information.

The data processing device 6 is, preferably but not necessarily, arranged to transmit to the indicator device 9, along with the status information, also additional information indicating to which part of the electrolytic process, i.e. cell voltage, electrolyte temperature, electrolytic cell circulation or electrolyte composition, the status information is related, and the indicator device 9 comprises, preferably but not necessarily, presentation means for presenting said additional information either visually or by a sound signal.

In case the electrolytic plant includes more than one electrolytic cell 1, the first electronic device 2 or the second electronic device 5 or the third electronic device 15 is, preferably but not necessarily, arranged to add positioning data to the process parameter, said data indicating the location of the electrolytic cell 1. Said positioning data can be used in the return channel arrangement, in transmitting the status information describing the electrolytic process in the electrolytic cell 1 to the correct indicator device 9 arranged in connection with the electrolytic cell 1, i.e. for correctly routing the status information from the data processing device to the indicator device 9 arranged in connection with the electrolytic cell 1.

In addition to the status information describing the electrolytic process in the electrolytic cell 1, the data processing means 7 of the data processing device 6 are, preferably but not necessarily, also arranged to establish longer time-span condition information of the electrolytic cell 1 on the basis of the already established status information, measurement parameters and a fuzzy and/or a logic inference algorithm. An arrangement for defining the condition information of an electrolytic plant is introduced in the publication WO 2005/052700 (Outokumpu Oyj).

Here the return channel arrangement 8 is arranged to transmit the condition information established by the data processing means 7 of the data processing device 6 to the indicator device 9 arranged in connection with the electrolytic cell 1. Now the indicator device 9 comprises second presentation means 11 for presenting the condition information established by the data processing device 6. Accordingly, the indicator device 9 is arranged to receive the condition information established by the data processing device 6 and to present the condition information established by the data processing device 6 by the second presentation means 11 of the indicator device 9.

In case the data processing means 7 of the data processing device 6 are arranged to establish longer time-span condition information of the electrolytic cell 1 on the basis of the already established status information, measurement parameters and a fuzzy and/or a logic inference algorithm, the return channel arrangement 8 is, preferably but not necessarily, arranged to transmit the condition information established by the data processing device 6 from the data processing device 6 to a third electronic device 15. Now the return channel arrangement 8 is arranged to receive the condition information transmitted by the data processing device 6 by a third electronic device 15 and to transmit the condition information established by the data processing device 6 from the third electronic device 15 to a second electronic device 5. Accordingly, the return channel arrangement 8 is now arranged to receive the condition information transmitted by the data processing device 6 in the second electronic device 5 and to transmit the condition information established by the data processing device 6 from the second electronic device 5 to the first electronic device 2. Further, the return channel arrangement 8 is arranged to receive the condition information transmitted by the second electronic device 5 in the first electronic device 2 and to transmit the condition information established by the data processing device 6 from the first electronic device 2 to the indicator device 9.

As an alternative, the return channel arrangement 8 can be arranged to transmit the condition information describing the status of the electrolytic process in the electrolytic cell 1 established by the data processing device 6 directly from the data processing device 6 to the indicator device 9.

In the arrangement illustrated in FIG. 2, each electrolytic cell 1 includes two indicator devices, 9 so that the first indicator device 9 presents the status information, and the second indicator device 9 presents the condition information.

The indicator device 9 provided in connection with the electrolytic cell 1 comprises, preferably but not necessarily, second presentation means 11 for visually presenting the condition information describing the status of the electrolytic process in the electrolytic cell 1.

In case the condition information established by the data processing device 6 can obtain many different values depending on the value of the process parameter measured by the sensor 3, for instance values 0 (normal level), 1 (warning), 2 (alarm), or 3 (critical), the presentation means 10 of the indicator device 9 also are arranged to visually present the condition information in different ways. For example, it is possible that the condition information is presented by different colors, for instance green when the condition information level is 0 (normal level), yellow when the condition information level is 1 (warning), amber when the condition information level is 2 (alarm), and red when the condition information level is 3 (critical). As an alternative, a certain color can also illustrate a certain process condition information to be measured, so that the different values of the condition information are illustrated by using periods of different light frequencies: 0 (turned off), 1 (flashing slowly), 2 (flashing rapidly), 3 (burning continuously).

As an alternative, or in addition, the indicator device 9 arranged in connection with the electrolytic cell 1 may comprise presentation means 11 for presenting the condition information describing the status of the electrolytic process in the electrolytic cell 1 by a sound signal or sound signals. Also the sound signal can be different depending on the condition information.

When necessary, one indicator device 9 can also be used for presented information related to several electrolytic cells 1.

The data processing device 6 is, preferably but not necessarily, arranged to transmit, along with the condition information, to the indicator device 9 additional information indicating to which part of the electrolytic process, such as cell voltage, electrolyte temperature, electrolytic cell circulation or electrolyte composition, the condition information is related, and the indicator device 9 comprises, preferably but not necessarily, presentation means for presenting said additional information either visually or by a sound signal.

In case the electrolytic plant includes more than one electrolytic cell 1, the first electronic device 2 or the second electronic device 5 of the process parameter transmission system 16 is, preferably but not necessarily, arranged to add positioning data to the process parameter, said data indicating the location of the electrolytic cell 1. Said positioning data can be used in the return channel arrangement for transmitting the condition information describing the electrolytic process in the electrolytic cell 1 to the correct indicator device 9 arranged in connection with the electrolytic cell 1, i.e. for correctly routing the condition information from the data processing device to the indicator device 9 arranged in connection with the electrolytic cell 1.

The invention also relates to a method for monitoring the status of an electrolytic process in an electrolytic cell 1 and for presenting said status.

In the method, at least one electrolytic process parameter is measured regularly and repeatedly by at least one sensor 3 provided in the electrolytic cell 1.

In a method according to the invention, the sensor 3 is also used for measuring, preferably but not necessarily, the cell voltage of the electrolytic cell 1.

In a method according to the invention, the sensor 3 is used, in addition, or as an alternative, preferably but not necessarily, for measuring the temperature of the electrolytic cell 1.

In a method according to the invention, the sensor 3 is used, in addition, or as an alternative, preferably but not necessarily, for measuring the electric current flowing in the electrolytic cell 1.

In addition, or as an alternative, in a method according to the invention, the sensor 3 is used, preferably but not necessarily, for measuring the composition of the electrolyte in the electrolytic cell. In a method according to the invention, the sensor 3 is used in addition, or as an alternative, preferably but not necessarily, for measuring the cell-specific magnetic field in the electrolytic cell 1.

In addition, or as an alternative, in a method according to the invention the sensor 3 is used, preferably but not necessarily, for measuring the magnetic field of the electrolytic cell 1 at several points.

In a method according to the invention, the sensor 3 is used, in addition, or as an alternative, preferably but not necessarily, for measuring stray currents in the electrolytic cell 1.

In addition, or as an alternative, in a method according to the invention, the sensor 3 is used, preferably but not necessarily, for measuring additives contained in the electrolytic cell 1.

In addition, or as an alternative, in a method according to the invention, the sensor 3 is used, preferably but not necessarily, for measuring the temperature of the conductor rails in the electrolytic cell 1.

In addition, or as an alternative, some other process parameter of the electrolytic process can be measured in a method according to the invention.

In the method, process parameters are transmitted from the sensor 3 to the data processing device 6, and process parameters are received in the data processing device 6.

In the method, there are transmitted, preferably but not necessarily, process parameters measured by a sensor 3, from the sensor 3 to a first electronic device 2, and process parameters are received in the first electronic device 2. To one first electronic device 2, process parameters can be transmitted from several sensors 3, which can be located in one and the same electrolytic cell 1, or in different electrolytic cells 1, as is illustrated in FIG. 3. In the method, process parameters measured by the sensor 3 are transmitted from the first electronic device 2 to the second electronic device 5, and process parameters are received in the second electronic device 5. In the method, process parameters measured by the sensor 3 are transmitted from the second electronic device 5 to a data processing device 6, and process parameters are received by the data processing device 6.

In FIGS. 3 and 4, process parameters measured by the sensor 3 are transmitted from the second electronic device 5 to the data processing device 6 through a third electronic device 15. In FIGS. 3 and 4, process parameters measured by the sensor 3 are transmitted from the second electronic device 5 to the third electronic device 15, and process parameters are received in the third electronic device 15. In FIGS. 3 and 4, process parameters measured by the sensor 3 are transmitted from the third electronic device 15 to the data processing device 6, and process parameters are received in the data processing device 6.

In the method, process parameters measured by the sensor 3 are interpreted by the data processing means 7 of the data processing device 6, and there is established status information describing the status of the electrolytic process in the electrolytic cell 1 by utilizing the process parameters measured by the sensor 3.

In the method, in connection with the electrolytic cell 1, there is arranged an indicator device 9 that comprises presentation means 10 for presenting the cell-specific status information established by the data processing means 7 of the data processing device 6, the cell-specific status information established by the data processing device 6 is transmitted from the data processing device 6 to the indicator device 9 arranged in connection with the electrolytic cell 1; the cell-specific status information established by the data processing device 6 is received in the indicator device 9, and the cell-specific status information is presented by the presentation means 10 of the indicator device 9.

The indicator device 9 is preferably, but not necessarily, arranged in the method as a cell specific indicator device that is configured to present only the status of the electrolytic cell 1 in connection which the indicator device 9 is arranged.

In the method the indicator device 9 is preferably, but not necessarily, arranged fixedly or releasably fastened to the electrolytic cell 1 or integrated into the electrolytic cell 1.

In the method, the process parameters measured regularly and repeatedly by the sensor 3 are converted, preferably but not necessarily, to data signals representing the process parameters, for example by means of an A/D converter, and data signals representing process parameters are transmitted to a data processing device 6. Now the data signals representing process parameters are interpreted by means of the data processing means 7 of the data processing device 6, and there is established status information describing the electrolytic process in the electrolytic cell 1 by utilizing the data signals representing process parameters.

In the method, the process parameters measured regularly and repeatedly by the sensor 3 are, preferably but not necessarily, converted to data signals representing process parameters in a first electronic device 2 for example by means of an A/D converter. Now the data signals representing process parameters are transmitted from the first electronic device 2, and data signals representing process parameters are received in a second electronic device 5 from the first electronic device 2. Accordingly, data signals representing process parameters are transmitted from the second electronic device 5, and data signals representing process parameters are received in the data processing device 6 from the second electronic device 5.

In FIGS. 3 and 4, in a different configuration from FIGS. 1 and 2, there are transmitted data signals measured by a sensor 3 and representing process parameters from a second electronic device 5 to a data processing device 6 through a third electronic device 15. In FIGS. 3 and 4, data signals measured by the sensor 3 and representing process parameters are transmitted from the second electronic device 5 to the third electronic device 15, and data signals representing process parameters are received in the third electronic device 15. In FIGS. 3 and 4, data signals measured by the sensor 3 and representing process parameters are transmitted from the third electronic device 15 to the data processing device 6, and the data signals representing process parameters are received in the data processing device 6.

In the method, there is calculated, preferably but not necessarily, by means of the data processing means 7 of the data processing device 6, the difference of the process parameter measured by the sensor 3 and the value of a predetermined and/or calculated theoretical process parameter, and there is established a difference trend. Thereafter, the data processing means 7 of the data processing device 6 are used for interpreting the difference and the difference trend by means of a mathematical model. Next, there is established, by using the data processing means 7 of the data processing device 6, an interpretation of the difference and the difference trend. Then the data processing means 7 of the data processing device 6 are used for establishing, on the basis of the interpretation of the difference and the difference trend, status information describing the status of the electrolytic process in the electrolytic cell 1 by means of a fuzzy and/or a logic inference algorithm.

The data processing means 7 of the data processing device 6 are operated, preferably but not necessarily, in the way described in the publication WO 2005/052700 (Outokumpu Oyj).

In the method, the status information established by the data processing means 7 of the data processing device 6 is transmitted, preferably but not necessarily, from the data processing device 6 to a second electronic device 5. After this the status information transmitted by the data processing device 6 is received in the second electronic device 5, and the status information established by the data processing device 6 is further transmitted from the second electronic device 5 to the first electronic device 2. Next, the status information transmitted by the second electronic device 5 is received in the first electronic device 2, and the status information established by the data processing device 6 is further transmitted from the first electronic device 2 to the data processing device 6.

As an alternative, the status information established by the data processing means 7 of the data processing device 6 can also be transmitted from the data processing device 6 to the second electronic device 5 through the third electronic device 15.

It is also possible that the status information established by the data processing means 7 of the data processing device 6 is transmitted directly from the data processing device 6 to the indicator device 9.

In the method, the status information describing the status of the electrolytic process in the electrolytic cell 1 is indicated, preferably but not necessarily, visually by an indicator device 9.

In case the status information established by the processing means 7 of the data processing device 6 can obtain many different values, depending on the value of the process parameter measured by the sensor 3, for instance the status information values 0 (normal level), 1 (warning), 2 (alarm), or 3 (critical), the status information is, preferably but not necessarily, indicated visually differently by the presentation means 10 of the indicator device 9, depending on the status information. For example, it is possible that the status information is presented by different colors, for instance green when the status information level is 0 (normal level), yellow when the status information level is 1 (warning), amber when the status information level is 2 (alarm), and red when the condition information level is 3 (critical). As an alternative, a certain color can also illustrate a certain status information to be measured, so that the different values of the status information are illustrated by using periods of different light frequencies: 0 (turned off), 1 (flashing slowly), 2 (flashing rapidly), 3 (burning continuously).

As an alternative, or in addition, the status information describing the status of the electrolytic process in the electrolytic cell 1 is indicated, preferably but not necessarily, as a sound signal or sound signals by the indicator device 9. Also the sound signal can be different depending on the status information.

The data processing device 6 is, preferably but not necessarily, arranged to transmit, along with the status information, to the indicator device 9 additional information indicating to which part of the electrolytic process, such as cell voltage, electrolyte temperature, electrolytic cell circulation or electrolyte composition, the status information is related, and the indicator device 9 comprises, preferably but not necessarily, presentation means for presenting said additional information either visually or by a sound signal.

In case the electrolytic plant includes more than one electrolytic cell 1, the first electronic device 2 or the second electronic device 5 adds, preferably but not necessarily, positioning data to the process parameter, said data indicating the location of the electrolytic cell 1. Said positioning data can be used in the return channel arrangement in transmitting the status information describing the status of the electrolytic process in the electrolytic cell 1 to the correct indicator device 9 arranged in connection with the electrolytic cell 1, i.e. for correctly routing the status information from the data processing device to the indicator device 9 arranged in connection with the electrolytic cell 1.

In the method, in addition to the status information, there is also established, preferably but not necessarily, by means of the data processing means 7 of the data processing device 6, longer time-span condition information of the electrolytic cell 1 on the basis of the established status information, measurement parameters and a fuzzy and/or a logic inference algorithm. Thus, in connection with the electrolytic cell 1, there is arranged an indicator device 9 comprising second presentation means 11 for indicating the condition information established by the data processing device 6. Now the condition information established by the data processing device 6 of the data processing means 7 is transmitted to an indicator device 9 arranged in connection with the electrolytic cell 1, the condition information established by the data processing device 6 is received in the indicator device 9, and the condition information of the electrolytic cell 1 is indicated by the indicator device 9.

The data processing means 7 of the data processing device 6 are operated, preferably but not necessarily, in the way described in the publication WO 2005/052700 (Outokumpu Oyj).

In case in the method there is established, in addition to the status information, also a longer time-span condition information of the electrolytic cell 1 by means of the data processing means 7 of the data processing device 6, the condition information established by the data processing device 6 is transmitted, preferably but not necessarily, from the data processing device 6 to a second electronic device 5. Now the condition information established by the data processing device 6 is received in the second electronic device 5, and the condition information is transmitted from the second electronic device 5 further to the first electronic device 2; the condition information is received in the first electronic device 2, and the condition information is transmitted from the first electronic device 2 further to the indicator device 9.

As an alternative, the condition information can be transmitted directly from the data processing device 6 to the indicator device 9.

In the arrangement illustrated in FIG. 2, each electrolytic cell 1 comprises two indicator devices 9, so that the first indicator device 9 presents status information, and the second indicator device 9 presents condition information.

The indicator device 9 arranged in connection with the electrolytic cell 1 comprises, preferably but not necessarily, second presentation means 11 for visually presenting the condition information describing the status of the electrolytic process in the electrolytic cell 1.

In case the condition information established by the processing means 7 of the data processing device 6 can obtain many different values, depending on the value of the process parameter measured by the sensor 3, for instance values 0 (normal level), 1 (warning), 2 (alarm), or 3 (critical), the presentation means 10 of the indicator device 9 are also arranged to present the condition information in different ways. For example, it is possible that the condition information is presented by different colors, for instance green when the condition information level is 0 (normal level), yellow when the condition information level is 1 (warning), amber when the condition information level is 2 (alarm), and red when the condition information level is 3 (critical). As an alternative, a certain color can also illustrate a certain condition information to be measured, so that the different values of the condition information are illustrated by using periods of different light frequencies: 0 (turned off), 1 (flashing slowly), 2 (flashing rapidly), 3 (burning continuously).

As an alternative, or in addition, the indicator device 9 arranged in connection with the electrolytic cell 1 may comprise presentation means 11 for presenting the condition information describing the status of the electrolytic process in the electrolytic cell 1 by a sound signal or sound signals. The sound signal can also be different depending on the condition information.

The data processing device 6 is, preferably but not necessarily, arranged to transmit, along with the condition information, to the indicator device 9 additional information indicating to which part of the electrolytic process, such as cell voltage, electrolyte temperature, electrolytic cell circulation or electrolyte composition, the condition information is related, and the indicator device 9 comprises, preferably but not necessarily, presentation means for presenting said additional information either visually or by a sound signal.

In case the electrolytic plant includes more than one electrolytic cell 1, the first electronic device 2 or the second electronic device 5 of the process parameter transmission system 16 adds, preferably but not necessarily, positioning data to the process parameter, said data indicating the location of the electrolytic cell 1. Said positioning data can be used in the return channel arrangement for transmitting the condition information describing the electrolytic process in the electrolytic cell 1 to the correct indicator device 9 arranged in connection with the electrolytic cell 1, i.e. for correctly routing the status information from the data processing device to the indicator device 9 arranged in connection with the electrolytic cell 1

For a man skilled in the art, it is obvious that along with the development of technology, the basic idea of the invention can be realized in many different ways. Thus the invention and its embodiments are not restricted to the above described examples only, but they can vary within the scope of the appended claims.

The invention claimed is:

1. An arrangement for monitoring and presenting the status of an electrolytic process such as an metal electrorefining process or an metal electrowinning process in an electrolytic cell (1), said arrangement comprising at least one sensor (3) arranged in connection with the electrolytic cell (1) for regularly and repeatedly measuring at least one process parameter of the electrolytic process, a data processing device (6) comprising data processing means (7) for interpreting the process parameters, regularly and repeatedly measured by the sensor (3), and for establishing status information describing the status of the electrolytic process in the electrolytic cell (1) by utilizing the process parameters regularly and repeatedly measured by the sensor (3), a process parameter transmission system (16) for transmitting the process parameters, regularly and repeatedly measured by the sensor (3), from the sensor (3) to the data processing device (6), and an indicator device (9) arranged in connection with the electrolytic cell (1) for indicating the status of the electrolytic process in the electrolytic cell (1), characterized by a return channel arrangement (8) for transmitting the status information describing the status of the electrolytic process in the electrolytic cell (1), established by the data processing means (7) of the data processing device (6), from the data processing device (6) to the indicator device (9) arranged in connection with the electrolytic cell (1), and in that the indicator device (9) comprises presentation means (10) for presenting the status information describing the status of the electrolytic process in the electrolytic cell (1), established by the data processing means (7) of the data processing device (6), in that the indicator device (9) is arranged to receive the status information established by the data processing means (7) of the data processing device (6) and to present the status information describing the status of the electrolytic process in the electrolytic cell (1), established by the data processing means (7) of the data processing device (6), with the presentation means (10)

in that the process parameter transmission system (16) comprises a first electronic device (2), which is in communication with at least one sensor (3) for receiving process parameters from at least one sensor (3), and which is arranged to transmit process parameters, and a second electronic device (5), which is in communication with several first electronic devices (2) for receiving process parameters from several first electronic devices (2), and which is arranged to transmit process parameters to the data processing device (6), and in that the indicator device (9) is a cell specific indicator device that is configured to present only the status of the electrolytic cell (1) in connection which the indicator device (9) is arranged.

2. An arrangement according to claim 1, characterized in that the data processing means (7) of the data processing device (6) are arranged to calculate the difference of a process parameter measured by the sensor (3) and a predetermined and/or calculated theoretical process parameter, and to establish a difference trend, the data processing means (7) of the data processing device (6) are arranged to examine the difference and the difference trend by utilizing a mathematical model, and to establish an interpretation of the difference and the difference trend, and that the data processing means (7) of the data processing device (6) are arranged to establish status information describing the status of the electrolytic process in the electrolytic cell (1), on the basis of the interpretation of the difference and the difference trend, by utilizing a fuzzy and/or a logic inference algorithm.

3. An arrangement according to claim 1, characterized in that the indicator device (9) comprises presentation means (10) for visually presenting the status information describing the electrolytic process in the electrolytic cell (1).

4. An arrangement according to claim 1, characterized in that the indicator device (9) comprises presentation means (10) for presenting the status information describing the electrolytic process in the electrolytic cell (1) by a sound signal or sound signals.

5. An arrangement according to claim 1, characterized in that the presentation means (10) of the indicator device (9) are arranged to present a signal dependent on the level of the status information.

6. An arrangement according to claim 1, characterized in that the data processing device (6) is arranged to transmit, along with the status information, to the indicator device (9) additional information indicating to which part of the electrolytic process, such as cell voltage, electrolyte temperature, electrolytic cell circulation or electrolyte composition, the status information is related, and that the indicator device (9) comprises, preferably but not necessarily, presentation means for said additional information for presenting said additional information either visually or by a sound signal, together with the status information.

7. An arrangement according to claim 1, characterized in that the first electronic device (2) or the second electronic device (5) is arranged to add positioning data to the process parameter, said positioning data indicating the location of the electrolytic cell (1), and that the positioning data is used in the return channel arrangement (8) for transmitting the status information describing the electrolytic process in the electrolytic cell (1) from the data processing device (6) to an indicator device (9) arranged in connection with the electrolytic cell (1).

8. An arrangement according to claim 1, characterized in that the data processing means (7) of the data processing device (6) are arranged to establish longer time-span condition information of the electrolytic cell (1) on the basis of the established status information, measurement parameters and a fuzzy and/or a logic inference algorithm, the return channel arrangement (8) is arranged to transmit the condition information established by the data processing means (7) of the data processing device (6) to the indicator device (9) arranged in connection with the electrolytic cell (1), the indicator device (9) comprises means for presenting the condition information established by the data processing device (6), and that the indicator device (9) is arranged to receive the condition information established by the data processing device (6) and to present the condition information established by the data processing device (6).

9. An arrangement according to claim 1, characterized in that the process parameter transmission system (16) comprises a first electronic device (2), which is in communication with at least one sensor (3) for receiving process parameters from at least one sensor (3), and which is arranged to transmit process parameters,
a second electronic device (5), which is in communication with at least one first electronic device (2) for receiving process parameters from at least one first electronic device (2), and which is arranged to transmit process parameters, and
a third electronic device (15), which is in communication with at least one second electronic device (5) for receiving process parameters from at least one second electronic device (15), and which is arranged to transmit process parameters to the data processing device (6).

10. An arrangement according to claim 1, characterized in that the indicator device (9) is fixedly or releasably attached to the electrolytic cell (1) or integrated into the electrolytic cell (1).

11. An arrangement according to claim 8, characterized in that the indicator device (9) comprises second presentation means (11) for visually presenting the condition information.

12. An arrangement according to claim 8, characterized in that the indicator device (9) comprises second presentation means (11) for presenting the condition information as a sound signal or sound signals.

13. And arrangement according to claim 8, characterized in that the second presentation means (11) of the indicator device (9) are arranged to give a signal dependent on the level of the condition information.

14. An arrangement according to claim 8, characterized in that
the data processing device (6) is arranged to transmit, along with the condition information, to the indicator device (9) additional information indicating to which part of the electrolytic process, such as cell voltage, electrolyte temperature, electrolytic cell circulation or electrolyte composition, the condition information is related, and that
the indicator device (9) comprises presentation means for presenting said additional information.

15. An arrangement according to claim 8, characterized in that
the sensor (3) or the first electronic device (2) is arranged to add positioning data to the process parameter, said data indicating the location of the electrolytic cell (1), and that
the positioning data is used in the return channel arrangement (8) for transmitting the status information describing the electrolytic process in the electrolytic cell (1) from the data processing device (6) to the indicator device (9) arranged in connection with the electrolytic cell (1).

16. A method for monitoring and presenting the status of an electrolytic process such as an metal electrorefining process or an metal electrowinning process in an electrolytic cell (1), in which method
at least one process parameter is regularly and repeatedly measured by at least one sensor (3) arranged in the electrolytic cell (1),
process parameters are transmitted from the sensor (3) to a data processing device (6), and process parameters are received in the data processing device (6),
process parameters are interpreted by the data processing device (6), and there is established status information describing the status of the electrolytic process in the electrolytic cell (1) by utilizing the process parameters, characterized
in that in connection with the electrolytic cell (1), there is arranged an indicator device (9) that comprises presentation means (10) means for presenting the status information established by the data processing device (6),
in that the status information established by the data processing device (6) is transmitted from the data processing device (6) to the indicator device (9) arranged in connection with the electrolytic cell (1), and that
in that the status information established by the data processing device (6) is received in the indicator device (9), and the status information is presented by the indicator device (9)
in that process parameters are transmitted from the sensor (3) to a first electronic
in that process parameters are transmitted from several first electronic devices (2) to a second electronic device (5), and process parameters are received in the second electronic device (5),
in that process parameters are transmitted from the second electronic device (5) to the data processing device (6), and
in that the indicator device (9) is arranged as cell specific indicator device that is configured to present only the status of the electrolytic cell (1) in connection which the indicator device (9) is arranged.

17. A method according to claim 16, characterized in that
by means of the data processing means (7) of the data processing device (6), there is calculated the difference of the process parameter measured by the sensor (3) and a predetermined and/or calculated theoretical process parameter, and there is established a difference trend,
by means of the data processing means (7) of the data processing device (6), the difference and the difference trend are interpreted by using a mathematical model,
by means of the data processing means (7) of the data processing device (6), there is established an interpretation of the difference and the difference trend, and that
by means of the data processing means (7) of the data processing device (6), there is established status information describing the electrolytic process in the electrolytic cell (1) by means of a fuzzy and/or a logic inference algorithm.

18. A method according to claim 16, characterized in that the status information is presented visually by the indicator device (9).

19. A method according to claim 16, characterized in that the status information is presented by the indicator device (9) as a sound signal or sound signals.

20. A method according to claim 16, characterized in that the status information is presented by the presentation means (10) of the indicator device (9) in different ways, depending on the status information.

21. A method according to claim 16, characterized in that
along with the status information, the data processing device (6) transmits to the indicator device (9) additional information indicating to which part of the electrolytic process, such as cell voltage, electrolyte temperature, electrolytic cell circulation or electrolyte composition, the status information is related, and that
in connection with the electrolytic cell (1), there is arranged an indicator device (9) that comprises means for indicating the additional information,
the additional information is presented in the indicator device (9) together with the status information.

22. A method according to claim 16, characterized in that
to the process parameters to be transmitted to the data processing device (6), there is added positioning data indicating the location of through electrolytic cell (1), and the positioning data is used in transmitting the status information describing the electrolytic process in the electrolytic cell (1) and in routing the status information to an indicator device (9) arranged in connection with the electrolytic cell (I).

23. A method according to claim 16, characterized in that
by means of the data processing means (7) of the data processing device (6), there is established a longer timespan condition information of the electrolytic cell (1) on the basis of the established status information, process parameters and a fuzzy and/or a logic inference algorithm,
in connection with the electrolytic cell (1), there is arranged an indicator device (9) that comprises means for indicating the condition information established by the data processing device (6),
the condition information established by the data processing means (7) of the data processing device (6) is transmitted to the indicator device (9) arranged in connection with the electrolytic cell (1),
the condition information established by the data processing device (6) is received by the indicator device (9), and the condition information of the electrolytic cell (1) is indicated by the indicator device (9).

24. A method according to claim 23, characterized in that the condition information is presented visually in the indicator device (9).

25. A method according to claim 23, characterized in that the condition information is presented by the indicator device (9) as a sound signal or sound signals.

26. A method according to claim 23, characterized in that the condition information is presented by the presentation means (10) of the indicator device (9) in different ways, depending on the status information.

27. A method according to claim 23, characterized in that along with the condition information, the data processing device (6) transmits to the indicator device (9) additional information indicating to which part of the electrolytic process, such as cell voltage, electrolyte temperature, electrolytic cell circulation or electrolyte composition, the condition information is related, and that
in connection with the electrolytic cell (1), there is arranged an indicator device (9) that comprises means for indicating the additional information,
the additional information is indicated in the indicator device (9) together with the condition information.

28. A method according to claim 23, characterized in that
to the process parameters to be transmitted to the data processing device (6), there is added positioning data indicating the location of the electrolytic cell (1), and
the positioning data is used in transmitting the condition information describing the electrolytic process in the electrolytic cell (1) and in routing the condition information to an indicator device (9) arranged in connection with the electrolytic cell (1).

29. A method according to claim 23, characterized in that
process parameters are transmitted from a sensor (3) to a first electronic device (2), and process parameters are received in the first electronic device (2),
process parameters are transmitted from the first electronic device (2) to a second electronic device (5), and process parameters are received in the second electronic device (5),
process parameters are transmitted from the second electronic device (5) to a third electronic device (15), and process parameters are received in a third electronic device (15), and that
process parameters are transmitted from the second electronic device (5) to a data processing device (6).

30. A method according to claim 23, characterized in that the indicator device (9) is arranged fixedly or releasably to the electrolytic cell (1) or integrated into the electrolytic cell (1).

* * * * *

UNITED STATES PATENT AND TRADEMARK OFFICE
CERTIFICATE OF CORRECTION

PATENT NO.         : 8,352,197 B2
APPLICATION NO.    : 12/743810
DATED              : January 8, 2013
INVENTOR(S)        : Ari Rantala It is certified that error appears in the above-identified patent and that said Letters Patent is hereby corrected as shown below:

Claim 13, line 1 (column 17) "And" should be --An--.

Claim 16, line 18 (column 18, line 1) "means (10) means" should be --means (10)--.

Claim 16, line 27 (column 18, line 10) after "(9)" should be --(9),--.

Claim 16, line 29 (column 18, line 12) after "electronic" should be inserted --device (2), and process parameters are received in the first electronic device (2),--.

Claim 16, line 37 (column 18, line 20) "as cell" should be --a cell--.

Claim 22, line 4 (column 18, line 66) "through" should be --the--.

Signed and Sealed this
Second Day of April, 2013

Teresa Stanek Rea
*Acting Director of the United States Patent and Trademark Office*